3,347,890
TRIORGANOTIN CARBODIIMIDES AND ISOUREAS AND THE PREPARATION THEREOF
Alwyn G. Davies, London, England, assignor to M & T Chemicals Inc., New York, N.Y., a corporation of Delaware
No Drawing. Filed Oct. 26, 1964, Ser. No. 406,571
18 Claims. (Cl. 260—429.7)

This invention relates to novel organotin compounds and to the process for preparing the same.

It is an object of this invention to provide novel compositions containing tin. It is a further object to provide novel techniques for preparing such compounds. Other objects will become apparent to those skilled in the art upon reading the following disclosure.

In accordance with certain of its aspects, this invention provides novel organotin compounds selected from the group consisting of $R_3Sn—N=C(OR')—R''$ and $R_3Sn—NR''—C(OR')=NR''$ wherein R and R'' are independently selected from the group consisting of alkyl, aryl and alkenyl; and R' is selected from the group consisting of alkyl, aryl, alkenyl, hydrogen and —$SnR_3$.

In accordance with certain of its other aspects, this invention provides a process for preparing organotin compounds selected from the group consisting of $R_3Sn—N=C(OR')—R''$ and $R_3Sn—NR''—C(OR')=NR''$ wherein R and R'' are independently selected from the group consisting of alkyl, aryl and alkenyl; and R' is selected from the group consisting of alkyl, aryl, alkenyl, hydrogen, and —$SnR_3$ which comprises reacting together an organotin compound of the formula $R_3SnOR'$ with an organic compound having at least one carbon-nitrogen multiple bond and selected from the group consisting of organic nitriles and organic carbodiimides.

The organic compound having at least one carbon-nitrogen multiple bond (hereinafter referred to as the unsaturated nitrogen compound) may be a nitrile or a carbodiimide. When it is a nitrile, it may typically have the formula $R''—C≡N$ wherein R'' is selected from the group consisting of alkyl, aryl, and alkenyl. When it is a carbodiimide, it may have the formula $R''—N=C=N—R''$ wherein R'' is selected from the group consisting of alkyl, aryl, and alkenyl. R'' may be unsubstituted or inertly substituted.

For example, R'' may be alkyl including methyl, ethyl, n-propyl, isopropyl, n-butyl, isobutyl, sec-butyl, tert-butyl, n-amyl, neopentyl, isoamyl, n-hexyl, isohexyl, heptyl, octyl, decyl, dodecyl, tetradecyl, octadecyl, cyclopentyl, cyclohexyl, cycloheptyl, cyclooctyl, etc. R'' may be aryl, including phenyl, naphthyl, anthryl, phenanthryl, etc. R'' may be ankenyl, including allyl, 1-propenyl, methallyl, buten-2-yl, buten-3-yl, penten-1-yl, hexenyl, heptenyl, octenyl, decenyl, dodecenyl, tetradecenyl, octadecenyl, etc. R'' may also be an inertly substituted radical of the type hereinbefore described. Typical inert substituents which may be present include alkyl, aryl, cycloalkyl, aralkyl, alkaryl, alkenyl, ether, halogen, etc. Typical substituted alkyls include trichloromethyl, 3-chloropropyl, 2-ethoxyethyl, benzyl, 4-methylcyclohexyl, 4-chlorocyclohexyl, β-phenylethyl, etc. Typically inertly substituted aryl include chlorophenyl, biphenyl, anisyl, tolyl, xylyl, p-nonylphenyl, p-styryl, etc. Typical substituted alkenyls include 4-chloro-2-butenyl, chloroallyl, 4-phenyl-3-butenyl, etc.

Thus, R''—C≡N may typically include acetonitrile, trichloroacetonitrile, propionitrile, butyronitrile, benzonitrile, p-tolunitrile, α-tolunitrile, p-chlorobenzonitrile, acrylonitrile, lauronitrile, etc. A preferred nitrile is trichloroacetonitrile.

R''—N=C=N'—R'' may typically include dicyclohexyl carbodiimide, bis(p-chlorophenyl) carbodiimide, bis(p-bromophenyl) carbodiimide, diallyl carbodiimide, bis(2-bromoallyl) carbodiimide, bis(p-dimethylaminophenyl) carbodiimide, bis(p-methoxyphenyl) carbodiimide, tert-butylmethyl carbodiimide, cyclohexylphenyl carbodiimide, dibenzyl carbodiimide, di-n-butyl carbodiimide, diethyl carbodiimide, di-n-octyl carbodiimide, di-n-amyl carbodiimide, diphenyl carbodiimide, di-1-naphthyl carbodiimide, di-1-phenanthryl carbodiimide, di-p-tolyl carbodiimide, benzylphenyl carbodiimide, di-p-tolyl carbodiimide, didodecyl carbodiimide, di-sec-butyl carbodiimide, bis(4-biphenylyl) carbodiimide. Preferred carbodiimides may include diphenyl carbodiimide and di-1-naphthyl carbodiimide.

In accordance with this invention, the unsaturated nitrogen compound may be reacted with a compound $R_3SnOR'$ wherein R is selected from the group consisting of alkyl, aryl, and alkenyl, and R' is selected from the group consisting of alkyl, aryl, alkenyl, hydrogen, and $R_3Sn—$.

For example, R may be alkyl including methyl, ethyl, n-propyl, isopropyl, n-butyl, isobutyl, sec-butyl, tert-butyl, n-amyl, neopentyl isoamyl, n-hexyl, isohexyl, heptyl, octyl, decyl, dodecyl, tetradecyl, octadecyl, cyclopentyl, cyclohexyl, cycloheptyl, cyclooctyl, etc. R may be aryl, including phenyl, naphthyl, anthryl, phenanthryl, etc. R may be alkenyl, including allyl, 1-propenyl, methallyl, buten-2-yl, buten-3-yl, penten-1-yl, hexenyl, heptenyl, octenyl, decenyl, dodecenyl, tetradecenyl, octadecenyl etc. R may also be an inertly substituted radical of the type hereinbefore described. Typical inert substituents which may be present include alkyl, aryl, cycloalkyl, aralkyl, alkaryl, alkenyl, ether halogen, etc. Typical substituted alkyls include trichoromethyl, 3-chloropropyl, 2-ethoxyethyl, benzyl, 4-methylcyclohexyl, 4-chlorocyclohexyl, β-phenylethyl, etc. Typical inertly substituted aryl include chlorophenyl, biphenyl, anisyl, tolyl, xylyl, p-nonylpenyl, p-styryl, etc. Typical substituted alkenyls include 4-chloro-2-butenyl, chloroallyl, 4-phenyl-3-butenyl. All of the R groups need not be the same. Preferably, R may be phenyl or lower alkyl, i.e. alkyl containing less than about 10 carbon atoms.

R' may be hydrogen or any of the alkyl, aryl or alkenyl radicals described for R. R' may also be $R_3Sn$ wherein R has the meaning hereinbefore given and $R_3SnOR'$ may be $(R_3Sn)_2O$. Preferably, R' may be phenyl or lower alkyl.

$R_3SnOR'$ may be a triorganotin alkoxide or aryloxide, such as trimethyltin methoxide, triethyltin ethoxide, tri-n-proplytin ethoxide, triisoproplytin methoxide, tri-n-butyltin methoxide, tri-n-butyltin ethoxide, tri-n-propyltin phenoxide, tri-n-butyltin phenoxide, triphenyltin 2-ethylhexoxide, triethyltin phenoxide, tritolyltin isopropoxide, tribenzyltin methoxide, tri-n-butyltin benzoxide etc.

$R_3SnOR'$ may be a triorganotin hydroxide or bis(triorganotin) oxide. As is well known to those skilled in the art, the triorganotin hydroxides and bis(triorganotin) oxides may coexist in equilibrium, or conditions may favor one form over the other. In this invention, either form may be used, including trimethyltin hydroxide, triethyltin hydroxide, bis(triethyltin) oxide, tri-n-propyltin hydroxide, bis(triisopropyltin) oxide, bis(tri-n-butyltin) oxide, triphenyltin hydroxide, bis(triphenyltin) oxide, tricyclohexyltin hydroxide, bis(tricyclohexyltin) oxide etc.

The general reaction of $R_3SnOR'$ with $R''—C≡N$ may be represented by Equation I (I) $R_3SnOR' + R''—C≡N \longrightarrow R_3Sn—N=C—R''$
$\phantom{R_3SnOR' + R''—C≡N \longrightarrow R_3Sn—N=C—R''}|$
$\phantom{R_3SnOR' + R''—C≡N \longrightarrow R_3Sn—N=C—R'}OR'$ In the specific embodiment wherein the reactants are trichloroacetonitrile and tri-n-butyltin methoxide, the reaction may be represented as (II) $(C_4H_9)_3SnOCH_3 + Cl_3C-C\equiv N \longrightarrow$ $$(C_4H_9)_3Sn-N=C-CCl_3$$
$$\qquad\qquad\qquad |$$
$$\qquad\qquad\quad OCH_3$$

When $R_3SnOR'$ is bis(tri-n-butyltin) oxide, the reaction may be expressed by Equation III (III) $((C_4H_9)_3Sn)_2O + Cl_3C-C\equiv N \longrightarrow$ $$(C_4H_9)_3Sn-N=C-CCl_3$$
$$\qquad\qquad\qquad |$$
$$\qquad\qquad\quad OSn(C_4H_9)_3$$

The general reaction of $R_3SnOR'$ with $$R''-N=C=N-R''$$

may be represented by Equation IV.

(IV) $R_3SnOR' + R''-N=C=N-R'' \longrightarrow R_3Sn-N-C=N-R'$
$$\qquad\qquad\qquad\qquad\qquad\qquad\qquad\qquad\quad |\ \ \ |$$
$$\qquad\qquad\qquad\qquad\qquad\qquad\qquad\qquad R''\ OR'$$

In the specific embodiment wherein the reactants are tri-n-butyltin methoxide and di-1-naphthyl carbodiimide, the reaction may be expressed as (V) $(C_4H_9)_3SnOCH_3 + C_{10}H_7N=C=NC_{10}H_7 \longrightarrow$ $$\qquad\qquad\qquad\qquad\qquad OCH_3$$
$$\qquad\qquad\qquad\qquad\qquad |$$
$$(C_4H_9)_3Sn-N-C=NC_{10}H_7$$
$$\qquad\qquad\qquad |$$
$$\qquad\qquad\ C_{10}H_7$$

When $R_3SnOR'$ is bis(tri-n-butyltin) oxide, the reaction may be expressed by Equation VI.

(VI) $((C_4H_9)_3Sn)_2O + C_{10}H_7N=C=NC_{10}H_7 \longrightarrow$ $$\qquad\qquad\qquad\qquad\qquad OSn(C_4H_9)_3$$
$$\qquad\qquad\qquad\qquad\qquad |$$
$$(C_4H_9)_3Sn-N-C=NC_{10}H_7$$
$$\qquad\qquad\qquad |$$
$$\qquad\qquad\ C_{10}H_7$$

The process of this invention is typically characterized by high yields of the desired products frequently approaching quantitative yield. Accordingly, essentially stoichiometric amounts of the reactants may preferably be employed, although an excess of either reactant may be employed if desired. Reaction may typically be effected by simply mixing together the desired reactants. If desired, one of the reactants may be added incrementally. The reaction may be exothermic and cooling means may preferably be provided to control the exotherm.

Typically, the reaction may be carried out at a temperature of about 0 to 100° C., preferably 0 to 50° C., say 25° C. Inert solvents may be employed to facilitate control of the reaction, improve heat transfer, provide fluidity, etc. Typical inert solvents which may be used include organic ethers such as ethyl ether, butyl ether, tetrahydrofuran, 2-methyltetrahydrofuran, tetrahydrofurfuryl ethyl ether, etc., and hydrocarbon solvents such as benzene, toluene, xylene, pentane, hexane, heptane, ligroin, petroleum ether, etc. Mixtures of two or more solvents may be employed, if desired. When an inert solvent is employed, it may typically be present in the amount of about 50–100 ml., preferably 100–250 ml., per mole of unsaturated nitrogen compound.

The novel organotin products may be recovered from the reaction in high yield by suitable techniques such as distillation, stripping, extraction, etc. These novel compounds are useful as fungicides, insecticides, bactericides, etc. They are also useful as intermediates in the preparation of amides, esters, etc.

Illustrative examples of the novel compounds of this invention include N,N'-diphenyl-N-tributylstannyl-O-methyl isourea; N,N'-di-1-naphthyl-N-tripropylstannyl-O-ethyl isourea; N,N'-dicyclohexyl-N-triethylstannyl-O-phenyl isourea; N,N'-dibenzyl-N-triphenylstannyl-O-2-ethylhexyl isourea; N,N'-diallyl-N-triisopropylstannyl-O-propyl isourea; N,N'-bis(p-chlorophenyl)-N-tribenzylstannyl-O-ethyl isourea; N,N'-didodecyl-N-tricyclohexylstannyl-O-methyl isourea; N,N'-diphenyl-N,O-bis(tributylstannyl)isourea; N,N'-di-1-naphthyl-N,O-bis(tributylstannyl) isourea; N-tributylstannyl trichloroacetimino methyl ether; N-tripropylstannyl acetimino ethyl ether; N-triphenylstannyl benzimino phenyl ether; N-tricyclohexylstannyl acrylimino methyl ether; N-tributylstannyl trichloroacetimino tributylstannyl ether; N-triphenylstannyl propionimino triphenylstannyl ether; etc.

Practice of this invention may be observed from the following illustrative examples.

EXAMPLE 1

*Reaction of tributyltin methoxide with trichloroacetonitrile*

0.56 gm. of tributyltin methoxide was mixed with 0.24 gm. of trichloroacetonitrile. The mixture did not give any visible indication that a reaction had taken place, but the infrared spectrum of the reaction mixture showed that a slow reaction occurred which was complete after about 15 hours. Volatile matter in the product was removed under reduced pressure to isolate the crude product, N-tributylstannyl trichloroacetimino methyl ether, but decomposition occurred when attempts were made to purify the product by distillation.

EXAMPLE 2

*Reaction of bis(tributyltin) oxide with trichloroacetonitrile*

0.438 gm. of trichloroacetonitrile was mixed with 1.272 gm. of bis(tributyltin) oxide at room temperature. The infrared spectrum of the reaction mixture was recorded at periodic intervals after the addition. The characteristic spectrum peaks of the reactants decayed and new peaks relating to the formation of the product appeared. After 36 hours, infrared spectrum analysis of the mixture indicated that the reaction was complete. The excess of trichloroacetonitrile was removed under vacuum to leave the crude N-tributylstannyl trichloroacetimino tributylstannyl ether as a light yellow oil. Attempts to purify the product by distillation resulted in decomposition.

Analysis of the product gave the following results:

| | Percent by weight |
|---|---|
| Carbon | 42.5 |
| Hydrogen | 7.75 |
| Nitrogen | 2.65 |
| Chlorine | 14.0 |

The theoretical analysis is as follows:

| | Percent by weight |
|---|---|
| Carbon | 42.2 |
| Hydrogen | 7.75 |
| Nitrogen | 1.9 |
| Chlorine | 14.35 |

EXAMPLE 3

*Reaction of tributyltin methoxide with di-1-naphthylcarbodiimide*

0.46 gm. of tributyltin methoxide were mixed with 0.407 gm. of di-1-naphthyl carbodiimide at room temperature in 2 cc. of dry benzene as solvent. After the reaction had subsided the benzene was removed under reduced pressure to leave the crude N,N'-di-1-naphthyl-N-tributylstannyl-O-methyl isourea as an oil.

Infrared analysis of the product showed that the characteristic peaks of the carbodiimide had disappeared and that new strong peaks were formed. An attempt to purify the product by distillation resulted in decomposition of the product.

The product was characterized by treating with water to give O-methyl-N,N-di-1-naphthyl isourea which was found to have a melting point within the range 157° C. to 158° C.

EXAMPLE 4

Reaction of bis(tri-n-butyltin) oxide with di-1-naphthyl carbodiimide

Bis(tributyltin) oxide (.07 gm.) was mixed with di-1-naphthyl carbodiimide (0.547 gm.) in 4 cc. of dry benzene. A reaction occurred after which the solvent was removed under reduced pressure to leave the crude product, N,N'-di-1-naphthyl-N,O-bis(tributylstannyl) isourea, as a mobile colourless oil.

An infrared spectrum analysis of the product confirmed that a reaction had occurred.

Analysis of the product gave the following results:

| | Percent by weight |
|---|---|
| Carbon | 60.4 |
| Hydrogen | 8.1 |
| Nitrogen | 3.1 |
| Tin | 26.6 |

The theoretical analysis of the product is:

| | Percent by weight |
|---|---|
| Carbon | 60.7 |
| Hydrogen | 7.7 |
| Nitrogen | 5.15 |
| Tin | 26.6 |

EXAMPLE 5

Reaction of bis(tributyltin) oxide with diphenylcarbodiimide

Bis(tributyltin) oxide (3.983 gm.) and diphenylcarbodiimide (1.44 gm.) were mixed at room temperature. The infrared spectrum of the reaction mixture showed that the yield of the adduct was practically quantative. The crude product, N,N'-diphenyl - N,O - bis(tributylstannyl) isourea was distilled at a temperature of 200° C. at a pressure of 0.05 to 0.01 mm. of Hg. The distilled product was found to be identical with N,N'-diphenyl-N,O-bis(tributylstannyl) isourea when prepared by an alternative method.

Although this invention has been illustrated by reference to specific examples, numerous changes and modifications thereof which clearly fall within the scope of the invention will be apparent to those skilled in the art.

What I claim as my invention and desire to secure by Letters Patent is:

1. A novel organotin compound selected from the group consisting of $R_3Sn—N=C(OR')—R''$ and $$R_3Sn—NR''—C(OR')=NR''$$

wherein R and R'' are independently selected from the group consisting alkyl, aryl and alkenyl; R' is selected from the group consisting of alkyl, aryl, alkenyl, hydrogen and —SnR₃.

2. The novel compound of claim 1 wherein R is lower alkyl.

3. The novel compound of claim 1 wherein R' is lower alkyl.

4. The novel compound of claim 1 wherein R' is phenyl.

5. A novel organotin compound selected from the group consisting of $R_3Sn—N=C(OR')—R''$ and $$R_3Sn—NR''—C(OR')=NR''$$

wherein R is lower alkyl; R'' is selected from the group consisting of alkyl, aryl, and alkenyl; and R' is selected from the group consisting of alkyl, aryl, alkenyl, hydrogen and —SnR₃.

6. The novel compound of claim 5 wherein R' is lower alkyl.

7. The novel compound of claim 5 wherein R' is phenyl.

8. N-tributylstannyl trichloroacetimino methyl ether.

9. N-tributylstannyl trichloroacetimino tributylstannyl ether.

10. N,N'-di-1-naphthyl - N - tributylstannyl-O-methyl isourea.

11. N,N' - di - 1 - naphthyl-N,O-bis(tributylstannyl) isourea.

12. The process for preparing an organotin compound selected from the group consisting of $$R_3Sn—N=C(OR')R''$$

and $$R_3Sn—NR''—C(OR')=NR''$$

wherein R and R'' are independently selected from the group consisting of alkyl, aryl and alkenyl; R' is selected from the group consisting of alkyl, aryl, alkenyl, hydrogen and —SnR₃; which comprises reacting together an organotin compound of the formula $R_3SnOR'$ with a compound selected from the group consisting of nitriles of the formula $R''—C≡N$ and carbodiimides of the formula $R''—N=C=N—R''$.

13. The process of claim 12 wherein R is lower alkyl.

14. The process of claim 12 wherein R' is lower alkyl.

15. The process of claim 12 wherein R' is phenyl.

16. The process for preparing an organotin compound selected from the group consisting of $$R_3Sn—N=C(OR')—R''$$

and $$R_3Sn—NR''—C(OR')=NR''$$

wherein R is lower alkyl; R'' is selected from the group consisting of alkyl, aryl, and alkenyl; and R' is selected from the group consisting of alkyl, aryl, alkenyl, hydrogen and —SnR₃; which comprises reacting together an organotin compound of the formula $R_3SnOR'$ with a compound selected from the group consisting of nitriles of the formula $R''—C≡N$ and carbodiimides of the formula $R''—N=C=N—R''$.

17. The process of claim 16 wherein R' is lower alkyl.

18. The process of claim 16 wherein R' is phenyl.

References Cited

UNITED STATES PATENTS 3,311,647  3/1967  Stamm _____ 260—429.7

TOBIAS E. LEVOW, *Primary Examiner.*

W. F. W. BELLAMY, *Assistant Examiner.*